US010546260B2

(12) United States Patent
Liao et al.

(10) Patent No.: US 10,546,260 B2
(45) Date of Patent: Jan. 28, 2020

(54) SYSTEM AND METHOD FOR RULE-BASED ANALYTICS OF TEMPORAL-SPATIAL CONSTRAINTS ON NOISY DATA FOR COMMERCIAL AIRLINE FLIGHT OPERATIONS

(71) Applicant: General Electric Company, Schenectady, NY (US)

(72) Inventors: Hongwei Liao, Niskayuna, NY (US); David So Keung Chan, Niskayuna, NY (US); James Kenneth Aragones, Clifton Park, NY (US); Mark Thomas Harrington, Cheltenham (GB); Pierino Gianni Bonanni, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 522 days.

(21) Appl. No.: 14/582,523

(22) Filed: Dec. 24, 2014

(65) Prior Publication Data
US 2016/0189080 A1 Jun. 30, 2016

(51) Int. Cl.
*G06Q 30/00* (2012.01)
*G06Q 10/06* (2012.01)
(Continued)

(52) U.S. Cl.
CPC ..... *G06Q 10/06393* (2013.01); *G06Q 10/025* (2013.01); *G06Q 10/047* (2013.01);
(Continued)

(58) Field of Classification Search
CPC ........... G06Q 30/0255; G06Q 30/0235; G06Q 10/105; G06Q 10/103; G06Q 10/067;
(Continued)

(56) References Cited

U.S. PATENT DOCUMENTS 6,134,500 A * 10/2000 Tang .................... G06Q 10/047
701/10
6,314,361 B1 11/2001 Yu et al.
(Continued)

FOREIGN PATENT DOCUMENTS

CN 101582203 A 11/2009
EP 1258823 A2 11/2002
(Continued)

OTHER PUBLICATIONS

Soomer et al., Scheduling aircraft landings using airlines' preferences. European Journal of Operational Research, 2008 (Year: 2008).*

(Continued)

*Primary Examiner* — Mehmet Yesildag
*Assistant Examiner* — Uche Byrd
(74) *Attorney, Agent, or Firm* — Buckley, Maschoff & Talwalkar, LLC

(57) ABSTRACT

A method, medium, and system to receive actual flight schedule data, including flight details associated with each flight of the actual flight schedule; determine an estimate of at least one of airline operations performance constraints and metrics based on the actual flight schedule data and at least one of business rules and an execution of a simulation-based model; and generate a record of corrected actual flight data based on the estimate of at least one of airline operations performance constraints and metrics and the actual flight data.

19 Claims, 5 Drawing Sheets

(51) Int. Cl.
  *G06Q 10/04* (2012.01)
  *G06Q 50/30* (2012.01)
  *G06Q 10/02* (2012.01)
  *G07C 5/02* (2006.01)

(52) U.S. Cl.
  CPC ......... *G06Q 10/0639* (2013.01); *G06Q 30/00* (2013.01); *G06Q 50/30* (2013.01); *G07C 5/02* (2013.01)

(58) Field of Classification Search
  CPC .. G06Q 30/02; G06Q 10/06315; G06Q 40/00; G06Q 30/00; G06Q 30/06; H04Q 7/20
  See application file for complete search history.

(56) References Cited

U.S. PATENT DOCUMENTS

| | | |
|---|---|---|
| 7,085,726 B1 | 8/2006 | Galperin et al. |
| 7,340,405 B1 | 3/2008 | Guenther et al. |
| 7,668,744 B2 | 2/2010 | Tiourine et al. |
| 7,725,337 B2 | 5/2010 | Chu et al. |
| 7,848,944 B1 | 12/2010 | Anbil |
| 8,050,936 B1 | 11/2011 | Jamotta et al. |
| 8,117,007 B2 | 2/2012 | Yitbarek et al. |
| 8,340,854 B2 | 12/2012 | Doulatshahi et al. |
| 8,554,457 B2 | 10/2013 | White et al. |
| 8,594,917 B2 | 11/2013 | Sawhill et al. |
| 8,744,902 B2 | 6/2014 | Nguyen et al. |
| 10,013,236 B2 * | 7/2018 | Bailey ............... G05D 1/101 |
| 2003/0004780 A1 | 1/2003 | Smith et al. |
| 2005/0065842 A1 | 3/2005 | Summers |
| 2005/0071206 A1 | 3/2005 | Berg |
| 2007/0214033 A1 | 9/2007 | Miller |
| 2007/0219833 A1 | 9/2007 | Trautman |
| 2009/0276250 A1 * | 11/2009 | King ..................... G06Q 10/02 705/5 |
| 2011/0246000 A1 * | 10/2011 | Shavit ................. G08G 5/0026 701/14 |
| 2012/0053916 A1 * | 3/2012 | Tzidon .................... G09B 9/08 703/8 |
| 2013/0117057 A1 * | 5/2013 | Van Moltke ..... G06Q 10/06311 705/7.13 |
| 2013/0138332 A1 | 5/2013 | Johnson et al. |
| 2013/0226373 A1 | 8/2013 | Bollapragada et al. |
| 2014/0081569 A1 | 3/2014 | Agrawal et al. |
| 2014/0257900 A1 | 9/2014 | Jacobs et al. |
| 2016/0217381 A1 * | 7/2016 | Bloomquist ............. G06N 5/02 |

FOREIGN PATENT DOCUMENTS

| | | |
|---|---|---|
| JP | H08-61974 A | 3/1996 |
| JP | H11-306480 A | 11/1999 |
| JP | 2001-307300 A | 11/2001 |
| JP | 2002329158 A | 11/2002 |
| JP | 2009527857 A | 7/2009 |
| JP | 2011170502 A | 9/2011 |
| JP | 2013186717 A | 9/2013 |
| JP | 2014029661 A | 2/2014 |
| JP | 2014041475 A | 3/2014 |

OTHER PUBLICATIONS

Hongwei Liao et al., filed Dec. 24, 2014, U.S. Appl. No. 14/582,602.
Hongwei Liao et al., filed Jan. 9, 2015, U.S. Appl. No. 14/593,578.
Ageeva et al., "MIT ICAT Approaches to Incorporating Robustness Into Airline Scheduling" MIT International Center for Air Transportation, Department of Aeronautics & Astronautics, pp. 1-94, Aug. 31, 2000.
Weide et al., "An Iterative Approach to Robust and Integrated Aircraft Routing and Crew Scheduling", Computer & Operations Research, vol. No. 37, Issue No. 5, pp. 833-844, May 1, 2010.
European Search Report and Opinion issued in connection with Related EP Application No. 16150605.0 dated Jun. 3, 2016.
Reiners T et al., "Integrated Aircraft Scheduling Problem: An Auto-Adapting Algorithm to Find Robust Aircraft Assignments for Large Flight Plans", System Science (HICSS), 2012 45th Hawaii International Conference on, IEEE Xplore, pp. 1267-1276; Conference Location: Maui, HI, Jan. 4-7, 2012.
Chiraphadhanakul et al., "Robust flight schedules through slack re-allocation". AGIFORS 51st Annual Symposium, 2011.
Lan et al., "Planning for Robust Airline Operations: Optimizing Aircraft Routings and Flight Departure Times to Minimize Passenger Disruptions", Transportation Science, vol. 40, No. 1, pp. 15-28, Feb. 2006.
Unofficial English Translation of Japanese Search Report issued in connection with Related JP Application No. 2015252724 dated Dec. 15, 2016.
Unofficial English Translation of Japanese Office Action issued in connection with Related JP Application No. 2015252724 dated Jan. 17, 2017.
I-Iaerne et al., "Airline Performance Modelling to Support Schedule Development: An Application Case Study", Proceedings of The 1988 Winter Simulation Conference, pp. 800-806, Dec. 12, 1988.
Wieland et al., "Parallel Simulation for Aviation Applications", Proceedings of The 1998 Winter Simulation Conference, vol. No. 02, pp. 1191-1198, Dec. 13, 1998.
US Non-Final Office Action issued in connection with Related U.S. Appl. No. 14/593,578 dated Apr. 7, 2016.
European Search Report and Opinion issued in connection with corresponding EP Application No. 15200057.6 dated Apr. 14, 2016.
European Search Report and Opinion issued in connection with Related EP Application No. 15198758.3 dated Apr. 26, 2016.
Japanese Search Report issued in connection with corresponding JP Application No. 2015-245792 dated Feb. 24, 2017.
Notification of Reasons for Refusal issued in connection with corresponding JP Application No. 2015-245792 dated Mar. 21, 2017.

* cited by examiner

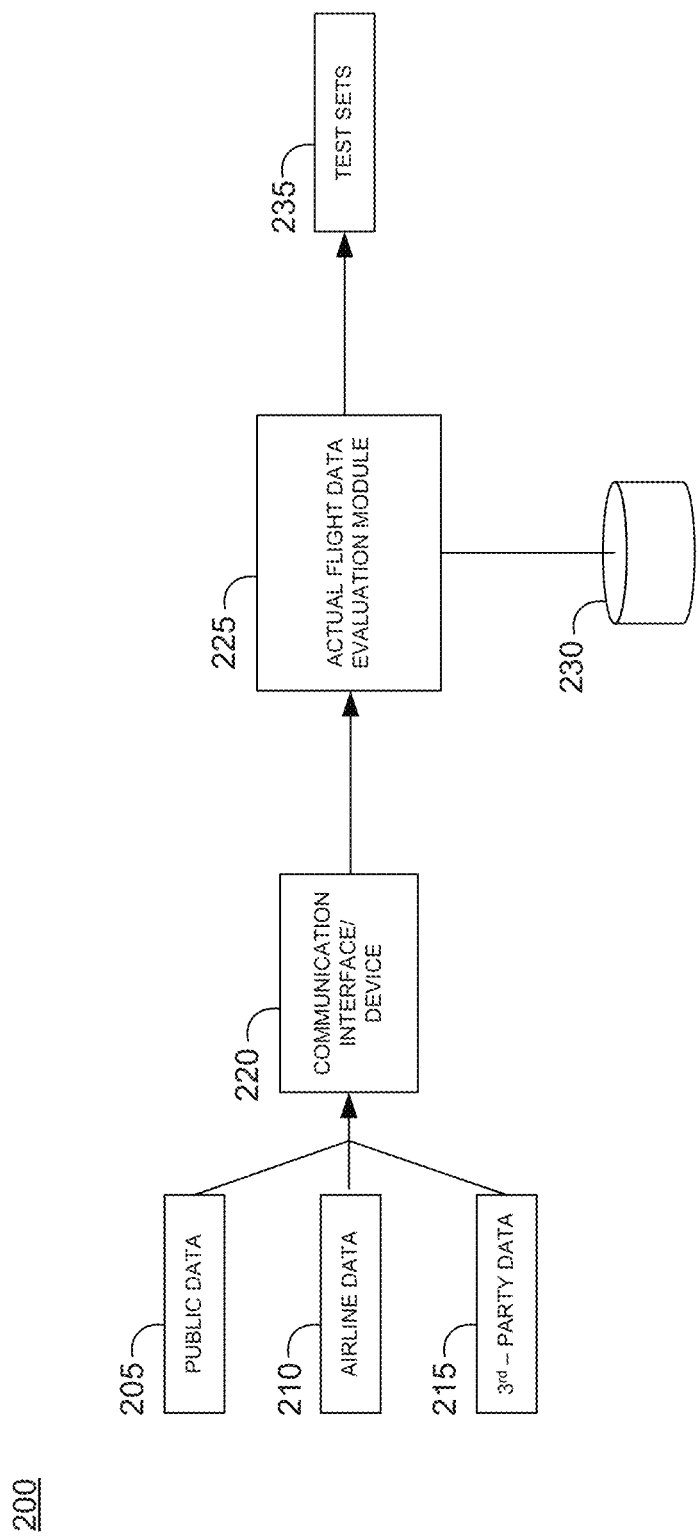

300

305 RECEIVE ACTUAL FLIGHT SCHEDULE DATA INCLUDING FLIGHT DETAILS ASSOCIATED WITH EACH FLIGHT OF THE ACTUAL FLIGHT SCHEDULE

310 DETERMINE AN ESTIMATE OF AT LEAST ONE OF AIRLINE OPERATIONS PERFORMANCE CONSTRAINTS AND METRICS BASED ON THE ACTUAL FLIGHT SCHEDULE DATA AND AT LEAST ONE OF BUSINESS RULES AND AN EXECUTION OF A SIMULATION-BASED MODEL

315 GENERATE A RECORD OF CORRECTED ACTUAL FLIGHT DATA BASED ON THE ESTIMATE OF AT LEAST ONE OF AIRLINE OPERATIONS PERFORMANCE CONSTRAINTS AND METRICS AND THE ACTUAL FLIGHT DATA

*FIG. 3*

SYSTEM AND METHOD FOR RULE-BASED ANALYTICS OF TEMPORAL-SPATIAL CONSTRAINTS ON NOISY DATA FOR COMMERCIAL AIRLINEFLIGHT OPERATIONS

BACKGROUND

An enormous quantity of data is generated during airline flight operations. The data may include statues and records of various resources related to commercial airlines. The data representing or corresponding to actual flight data may be recorded and saved for use by a reporting system or device and other types of processing systems. However, the actual flight data may include some errors therein, including but not limited to incomplete records, duplicative records, out-of-range values, etc. Using actual flight data containing errors for other processing tasks may result in unreliable and inaccurate processing results.

Therefore, it would be desirable to design an apparatus and method that provides an automatic evaluation and validation of actual flight data of airline operations for an airline.

SUMMARY

According to some embodiments, a method and system is provided for evaluating and validating data related to, in some embodiments, commercial airline flight operations. In some aspects, the concepts, systems, processes, and various embodiments disclosed herein may be applied to and used in other contexts, including for example, any transportation system or logistics system having multiple legs or segments between start and stop destinations. In some embodiments, a system herein includes an actual flight data evaluation module to evaluate and validate data associated with an actual flight schedule and determine airline operations performance constraints and metrics based on the actual flight schedule data and business rules and/or an execution of a simulation-based model.

A technical effect of some embodiments of the present disclosure is an efficient technique and system for evaluating and validating data related to, in some embodiments, commercial airline flight operations. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

BRIEF DESCRIPTION OF THE DRAWINGS

FIG. 2 is an illustrative depiction of a system, according to some embodiments;

FIG. 3 is a depiction of a flow diagram, according to some embodiments;

DETAILED DESCRIPTION

The following description is provided to enable any person in the art to make and use the described embodiments. Various modifications, however, will remain readily apparent to those in the art.

Figure 1:
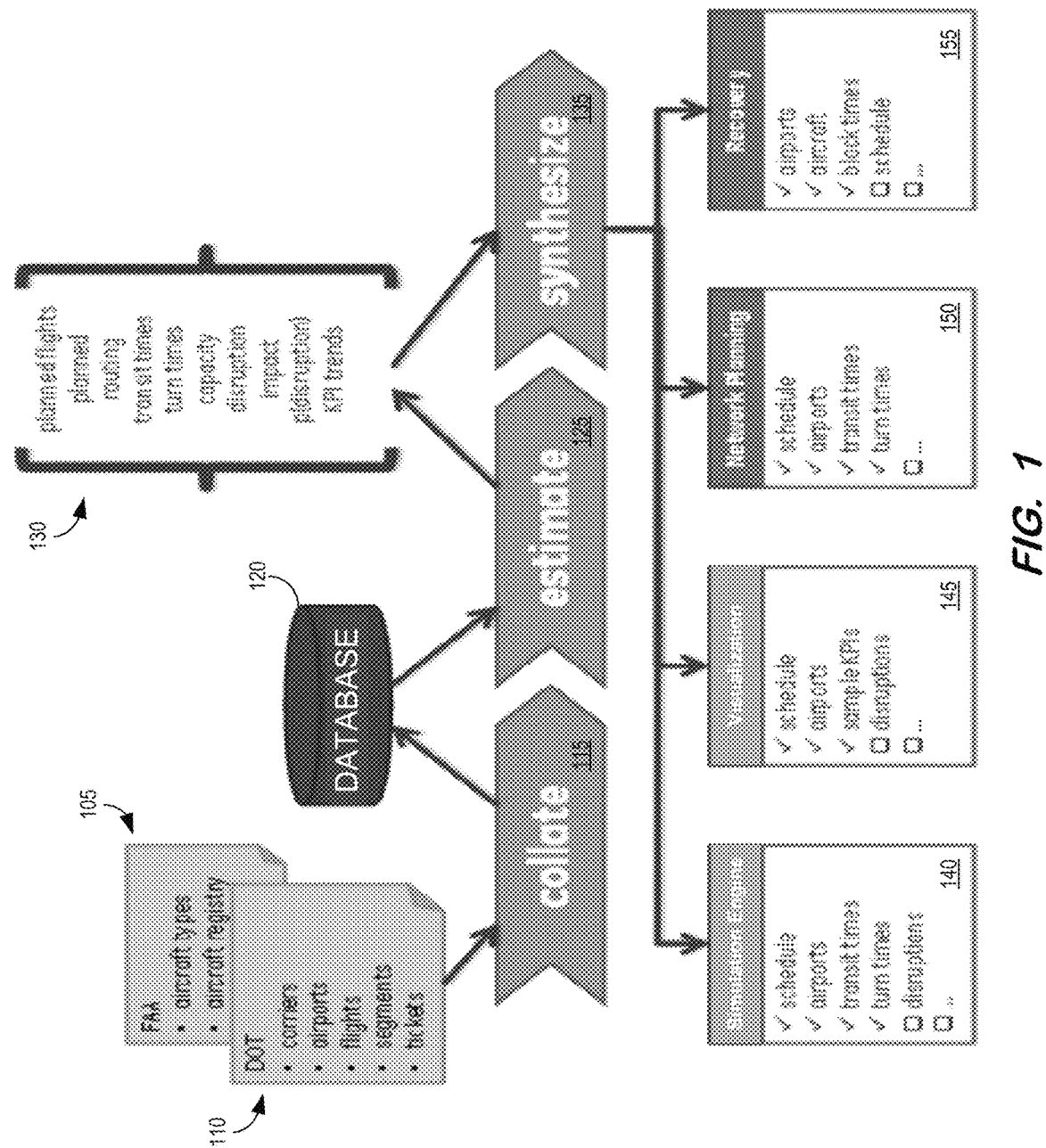
FIG. 1 is an illustrative, logical overview of an information flow, according to some embodiments.

FIG. 1 is an illustrative logical overview of an information flow for a process, and platform for evaluating and validating data associated with a transportation system or a logistics system having multiple legs or segments between start and stop destinations. FIG. 1 will be discussed primarily in the context of a commercial airline having a flight schedule that includes many flights (e.g., 100's or even 1000's) between numerous destinations. In some embodiments, a system or platform supporting, facilitating, or providing the flow of information and process 100 shown in FIG. 1 receives actual flight schedule data, where the actual flight schedule data includes flight details related to each of the flights disclosed in the actual flight schedule data. As used herein, the actual flight schedule data includes historical data indicative or representative of the details that actually occurred during the operation of an airline's flight schedule. In some aspects, the details associated with the at least one flight of the actual flight schedule data may include at least one of a flight number, a flight departure time, a flight arrival time, a flight departure airport, a flight arrival airport, an aircraft type for the at least one flight, flight crew details for the at least one flight, other specific information related to the flight including but not limited to desired city pairs, desired flight times, block times, aircraft assets, airports, airport gate assignments, ground crews, and flight crews, and combinations thereof. These types of details or a subset of the details may be included for each flight in the actual airline schedules. Accordingly, the actual flight schedule data may be complex and well-suited for being developed, stored, and managed by database system 120. Database system 120 may comprise a relational database, a multi-dimensional database, an eXtendable Markup Language (XML) document, or any other data storage system storing structured and/or unstructured data. Database system 125 may comprise a distributed database system having data thereof distributed among several relational databases, multi-dimensional databases, and/or other data sources, an object oriented database, a hybrid database, and other types of database management systems including an in-memory database system that can be provided in the "cloud" and as a service, without limit or loss of generality.

While the actual flight schedule data may deviate from a planned flight schedule due to one or more airline disturbances (e.g., weather-related delays, equipment failures, crew shortages, etc.) experienced during operation of a flight schedule, some deviations reported in the actual flight data may be impermissible. Additionally, the actual flight schedule data may include some inaccuracies due to one or more causes, thereby making the data "noisy". The inaccuracies may be caused by, for example, data inconsistencies, duplicate data, data recording/reporting errors, etc. Using "noisy" data in data analysis, reporting, and planning processes may cause unreliable results in those efforts. In some aspects, process 100 may operate to evaluate the actual flight schedule data to determine the "noise" therein, and clean up the data (e.g., remove data errors) so that the actual, corrected flight schedule data may be useful for further processing and reporting purposes.

The actual flight schedule data (also referred to herein as actual flight data) may include data from one or more sources. In some embodiments, the actual flight data may be publicly available data such as that provided by public (i.e., governmental) aviation and/or transportation agencies. As an example, flight data 105 may be received from an aviation regulatory agency such as the Federal Aviation Administration (FAA). Flight data 105 may include flight details such as, for example, aircraft types, aircraft registry, and other historical details related to flights. Flight data 110 may include flight data details provided by a transportation related agency such as, for example, the Department of Transportation (DOT). The flight data provided by the DOT may include, for example, flight details including carriers, airports, flights, segments, tickets, and other details related to actual, historical flights. In some embodiments, the actual flight schedule data may be provided from or obtained from a third-party service provider (e.g., an airline service provider that aggregates data from different sources, etc.) and data generated and maintained by an airline itself. Thus, data 105 and 110 are representative of the different sources for flight data, including those not specifically depicted in FIG. 1.

The actual flight data 105, 110 may be collected or otherwise obtained and collated at 115. As used herein, collating the actual flight data may include collecting the actual flight data from the different sources and arranging it together in a configuration that is useful and sensible for analysis herein. In some aspects, the data may be collated such that all of the details related to a specific flight are logically arranged together (e.g., in a common file/record, cross-referenced according to some specified naming and/or organizing schema, etc.). In some aspects, collating the data may include converting the received data into a particular data file or other data structure format.

The collated data may be stored in a database management system 120 or other data store. In some aspects, database 120 may store the data in a manner optimized for the storage and retrieval of the actual flight data. In some aspects, database 120 may store some of the data therein in-memory (e.g., random access memory (RAM)) for quick retrieval and other data in disk-based storage units. In some aspects, database 120 may be a distributed database or a cloud-based storage solution.

At 125 of FIG. 1, the system may operate to estimate network performance and metrics based on the actual flight data and one or more of business rules and a simulation-based model of flight schedule operations. The business rules may include rules to detect and repair temporal-spatial constraint violations and other constraints in the actual flight data. The temporal-spatial constraints address realistic violations of both time (i.e., temporal) and space (i.e., spatial). For example, a data event may be determined to violate temporal constraints if the actual flight data reports an aircraft XX leaving a destination (e.g., aircraft XX servicing flight 100 departs a particular airport at 1:00 PM) before it actually arrives at that destination (e.g., aircraft XX servicing flight 200 arrives at the airport at 2:00 PM). Such data is unrealistic and indicates that there is a problem with the actual flight data. In another example, the actual flight data may violate a spatial constraint. For example, the actual flight data may report an aircraft YY arriving at a first airport but departing from a second airport. Such data is an indication of an error in the actual flight data since an aircraft cannot be in two different places at the same time (e.g., first airport and second airport). That is, teleporting of the aircraft YY is not realistic or feasible.

While the temporal-spatial type of errors in data is discussed in the contexts of aircrafts, the same or similar types of constraints may be applied to other resources such as, for example, airline crews, passengers, cargo, etc. These and other types of resources (including those in non-airline contexts) may be tracked in association with airline flights (or other transportation and logistical contexts). In some aspects, not all of the different types of resources may be associated with every flight (e.g., a flight may not include passengers even though it may have cargo).

In some embodiments, the estimation of the network performance and metrics at operation 125 may include an aspect of data clean-up in support of analytics. In particular, planned equipment routing may be inferred from the actual flight data. As an example, given the actual flight schedule, a determination of the routing of the aircraft servicing the flights of the flight schedule may be inferred, derived, or otherwise determined. The actual flight data may report, in one or more files/records, that a particular aircraft traveled to four different airports on a particular day. Such information may be used to determine which route(s) this aircraft serviced on the subject day. Hereto, this type of analysis may be applied to other resources in addition to or instead of aircraft.

In some embodiments, the estimation of the network performance and metrics at operation 125 may include an analytics aspect of inferring root causes for propagated delays for flights in the actual flight data. Based on the actual flight data and further on a planned flight schedule, processes herein may be executed to determine deviations from the planned flight schedule. The deviations may be referred to herein a flight operations disturbances and may include two components, a root (primary) cause and a propagation delay. The root cause refers to the disturbance initially introduced to a particular flight or segment/leg thereof. The propagation delay refers to delay(s) caused by an upstream, previous disturbance. In some aspects, the root cause(s) may be determined by examining the actual flight data and determining where and when flight operations disturbances first begin.

In some embodiments, the estimation of the network performance and metrics at operation 125 may include an analytics aspect of inferring network throughput (utilization) constraints. In some aspects, throughput for an airport or other resource may not be expressly stated in the actual data 105, 110, accessible or known to an airline (or other entity). In some regards, an airline may not know the actual throughput for an airport or other resource (aircraft, flight crew, airport gates, etc.). Accordingly, the throughput of the airport and other resources may be desired and useful information in optimizing various aspects of an airline (or other industry).

As used herein, throughput may generally refer to the utilization of assets or resources. The assets and resources may include aircraft, airports, runways, airport gates, cargo, passengers, airline crews, employees, etc. For example, given actual flight schedule data, the data may be analyzed to determine one or more aspects of throughput. For example, a take-off rate and a departure rate at a particular airport during a specific time frame or period may be determined based on the actual flight data.

As an example of airport throughput (utilization) determination, actual flight data for a particular airport may indicate that aircraft throughput for the airport is saturated at a particular level (e.g., number of aircraft). A determination of the airport constraints that limit throughput may be executed by some embodiments herein. The determined constraints may include available airport resources such as, for example, the number of gates, the number of runway slots, hours of operation or airport curfews, etc. for the particular airport.

Herein, throughput may be expressed in terms of the utilization of resources other than aircraft. For example, a determination of the throughput of business travelers at an airport, group of airports, or within a country or region based on the actual flight data may be used to determine or infer an indication of the health/strength of the related economy.

In some embodiments, the estimation of the network performance and metrics at operation 125 may include an aspect of data clean-up, namely the detection and correction of unrealistic data. The unrealistic data may be characterized with values that are outside of a reasonable and/or acceptable range for a parameter or set of parameters. For example, an aircraft reportedly flying non-stop for hours/miles more than its known range, an aircraft reportedly carrying more passengers than the aircraft is configured to carry, a crew member reportedly working for hours more than the legal allowance, and other data points outside of an acceptable and/or reasonable range may indicate an error in the actual flight data. Upon detection of unrealistic or otherwise unacceptable data, the systems, devices, and platforms herein may operate to correct the data. In some instances, the proper value for the parameters may be determined, based on a knowledge of the parameters and other factors. In some embodiments, data determined to be erroneous or otherwise unacceptable may be flagged or otherwise noted as being such. Flight data flagged as being erroneous or otherwise unacceptable may be segregated, not included, or packaged with other data for further processing and reporting since this data is unrealistic and thus unreliable for data analysis purposes.

An illustrative example of some of the particular network performance constraints and metrics 130 estimated at operation 125 may include constraints and metrics related to determining one or more of: planned flights, planned routing of the flights, transit times of flights, a capacity of resources associated with the flights in the actual flight schedule, the different types of flight disturbances, and the determination of one or more key performance indicators (KPIs) from the actual flight data. The particular KPIs for an instance of process 100 may be specific to an airline or airline manager's (or other entity's) preferences and objective(s). The network performance constraints and metrics are quantitative parameters, each being a representation of a value associated with the one or more quantitative measures associated with, assigned to, defined for, or specified for aspects of a flight. The network performance constraints and KPIs may represent multiple factors, parameters, and considerations an airline (or other entity) values as important, insightful, or key indicators of performance of a flight. In some aspects, the quantitative value of the representation of the robustness may include a scaled, a relative ranking, a normalized value, and other value formats. The network performance constraints and KPIs may characterize, for example, the airline's performance related to on-time departure, on-time arrival, flight delays, flight cancellations, passenger satisfaction, cargo, revenue, costs, and other factors.

In some embodiments, a simulation-based model of flight operations may be used to expose or highlight aspects of the actual flight data to an evaluation and/or validation process. The execution of a simulation-based model of flight operations may include a thorough and detail simulation of operations for an airline, including an injection of actual, historical disturbances corresponding to the time frame of the actual flight data. By executing the simulation-based model using the actual flight data, inaccuracies and errors in the actual flight data may be exposed and identified. Once identified, the particular data errors may be corrected by various different processes or at least flagged and not relied upon for network processing or reporting since it is identified as erroneous.

The determined network preferences and metrics 130 may be used, in some embodiments, to create or synthesize test sets of clean, reliable corrected actual flight data based on the estimate of at least one of airline operations performance constraints and metrics and the actual flight data that is accurately representative of actual flights at 135. The test sets of data may be used for one or more purposes, including processing and reporting efforts. Such purposes may include network planning, data visualization and reporting, recovery analysis and planning, and other purposes.

In some embodiments, the test sets of data that have been evaluated and cleaned-up may be used by a simulation engine 140 system or device internal to an airline (or other entity) that executes simulations to develop and/or evaluate proposed flight schedules and other aspects of the airline (or other industry). In some aspects, the test sets of cleaned-up data may be used by a data visualization and reporting device or system 145. Some such systems may include an enterprise dashboard application or service that may generate dashboards and reports of a past and a current operating status of the airline (or other industry/business organization). In some aspects, the test sets of cleaned-up data may be used by a network planning device or system 150. This network planning system may be used to develop and evaluate proposed flight schedules, where the planned flight schedules are typically developed months in advance of any planned implementation thereof. In some embodiments, the actual flight data determined to be accurate may be used in determining the flight schedules where, for example, proposed flight schedules may be evaluated and verified using a simulation-based model and at least some aspects of actual flight data. In some aspects, the test sets of cleaned-up data may be used by a recovery evaluation device or system 155. This type of system or device may operate to identify and evaluate an ability/capacity of an airline to absorb disruptions during operations (i.e., day before or day of a flight) and recover from disruptions to the airline operations.

In some aspects, the different sample data types that may be used by the devices or systems 140-155 are indicated by a "check mark". As seen, there is a variety of data types that may be included in the test sets of data synthesized at 135. In some embodiments, the test sets of cleaned-up data synthesized at 135 may be used for other purposes not specifically outlined in FIG. 1, without any loss of generality herein.

FIG. 2 is an illustrative block diagram of system 200 that may be used in some implementation embodiments herein. FIG. 2 includes a number of different sources of actual flight data, including publicly available data 205, data 210 internal to an airline (or other entity depending on the specific use-case), and data 215 provided or sourced from third-party providers. The actual flight data from one or more of sources 205, 210, 215 may be transmitted or communicated, via a communication device, system, network, or other interface 220, to an actual flight data evaluation module 225. Actual flight data evaluation module 225, in accordance with some other aspects herein, may perform or provide at least some of the functionality depicted in FIG. 1. Actual flight data evaluation module 225 may comprise one or more different or distinct systems and devices that cooperate with each other to provide at least some of the functionality depicted and discussed with respect to FIG. 1. In some embodiments, Actual flight data evaluation module 225 may include an execution engine including a multi-core distributed processing system that may execute multiple execution threads simultaneously in parallel. As also shown, Actual flight data evaluation module 225 may access a data storage device 230. Data storage device 230 may be implemented as a relational database management system or other configurations of a database system, including an in-memory database system, that stores and persists actual flight data received and used by Actual flight data evaluation module 225 and the analyzed and validated data (e.g., test sets of data) generated by actual flight data evaluation module 225. Actual flight data evaluation module 225 may, in some embodiments and instances, provide an output of the test set(s) of data. The test set(s) of data output by actual flight data evaluation module 225 may be in the form of records, files, reports, and data visualizations and may be used for one or more purposes, as discussed hereinabove. The test set(s) may comprise a record of corrected actual flight data based on the estimate of at least one of airline operations performance constraints and metrics and the actual flight data.

FIG. 3 is an illustrative flow diagram of a process 300 that may be performed by a system, in accordance with some embodiments herein. In some instances, aspects of a platform, information flow (e.g., FIG. 1), and system (e.g., FIG. 2) may be used to implement at least some of the operations of process 300 shown in FIG. 3. In part, some details related to process 300 have been presented hereinabove in the introduction and discussion of information flow 100 and system 200. Accordingly, while a complete discussion of FIG. 3 will now be disclosed below, certain details that may be repetitive in nature may not be repeated since they may already be disclosed elsewhere herein.

Referring to FIG. 3, a process related to providing a platform or framework for an evaluation and validation of actual flight data for an airline is disclosed. Process 300 may be implemented by a system, application, or apparatus configured to execute the operations of the process. In general, process 300 relates to a process to efficiently (1) evaluate an accuracy of actual flight data and (2) generate test set(s) of data including a record of corrected actual flight data based on an estimate of at least one of airline operations performance constraints and metrics and the actual flight data. In some embodiments, various hardware elements of an apparatus, device or system embodying system 200 execute program instructions to perform process 300. As an example, the present disclosure provides a mechanism to evaluate actual flight data for errors therein that defy business logic, flight operations logic, and other constraints and metrics and further provides a record of corrected actual flight data.

In some embodiments, hard-wired circuitry may be used in place of, or in combination with, program instructions for implementation of processes according to some embodiments. Program instructions that can be executed by a system, device, or apparatus to implement process 300 (and other processes and sub-processes disclosed herein) may be stored on or otherwise embodied as non-transitory, tangible media. Embodiments are therefore not limited to any specific combination of hardware and software.

Prior to operation 305, applications or services executing on a device or system (not shown in FIG. 3) such as, for example, a server-side computing device (e.g., an application server) of a distributed database system may be developed and deployed to develop, receive, manage, and/or persist actual flight data, including details related thereto. Process 300 may receive the actual flight data from one or more sources, via one or more devices or systems and communication protocols. The generation and acquisition of actual flight data may therefore be provided to process 300.

At operation 305, actual flight data is received. The actual flight data may be received from a communication interface or device that may be integral to or separate from a device or system implementing process 300. In some instances, different portions of the actual flight data may be sourced from a different location, system, or entity than other portions thereof. In some aspects, the actual flight data will include historical representations of flight operation details resulting from an execution of a flight plan or at least portions thereof during a specific period of time. The actual flight data will include the specific details of each flight in the actual flight data, including, for example, historical departure and arrival times of the flights, cancelled flights, and flights added to the schedule during the actual, historical execution of the planned flight schedule.

At operation 310, a determination of an estimate of at least one of airline operations performance constraints and metrics based on the actual flight schedule data and at least one of business rules and an execution of a simulation-based model is executed or accomplished. Operation 310 may include, in some embodiments, evaluating and analyzing the actual flight data with respect to one or more performance constraints and metrics, where the performance constraints and metrics have been defined to represent factors considering important or key aspects of the actual flight data. In some embodiments, the evaluating and analyzing of the actual flight data may be performed using, at least in part, a simulation-based model of airline flight operations. Subjecting the actual flight data to the simulation may operate to expose errors and impermissible data points in the actual flight data. In some regards, the performance constraints and metrics herein may, in part, define criteria for determining the errors in the actual flight data.

Continuing with process 300, operation 315 includes a generation of a record of corrected actual flight data (e.g., test sets of data) based on the estimate of at least one of airline operations performance constraints and metrics and the actual flight data. That is, the test sets of data will include corrected actual flight data that is an accurate reflection of actual flight operations since the errors, if any, in the actual flight data received at operation 305 is identified and corrected or removed at operation 310.

FIG. 3 further includes an indication that the record of corrected actual flight data (e.g., test sets of data) generated by process 300 at operation 315 may be further processed and otherwise used, as illustrated by the arrow exiting operation 315. As discussed in detail hereinabove, the record of corrected actual flight data may be used for a variety of purposes, including network planning, reporting, recovery analysis, data visualization, and other aspects.

Figure 4:
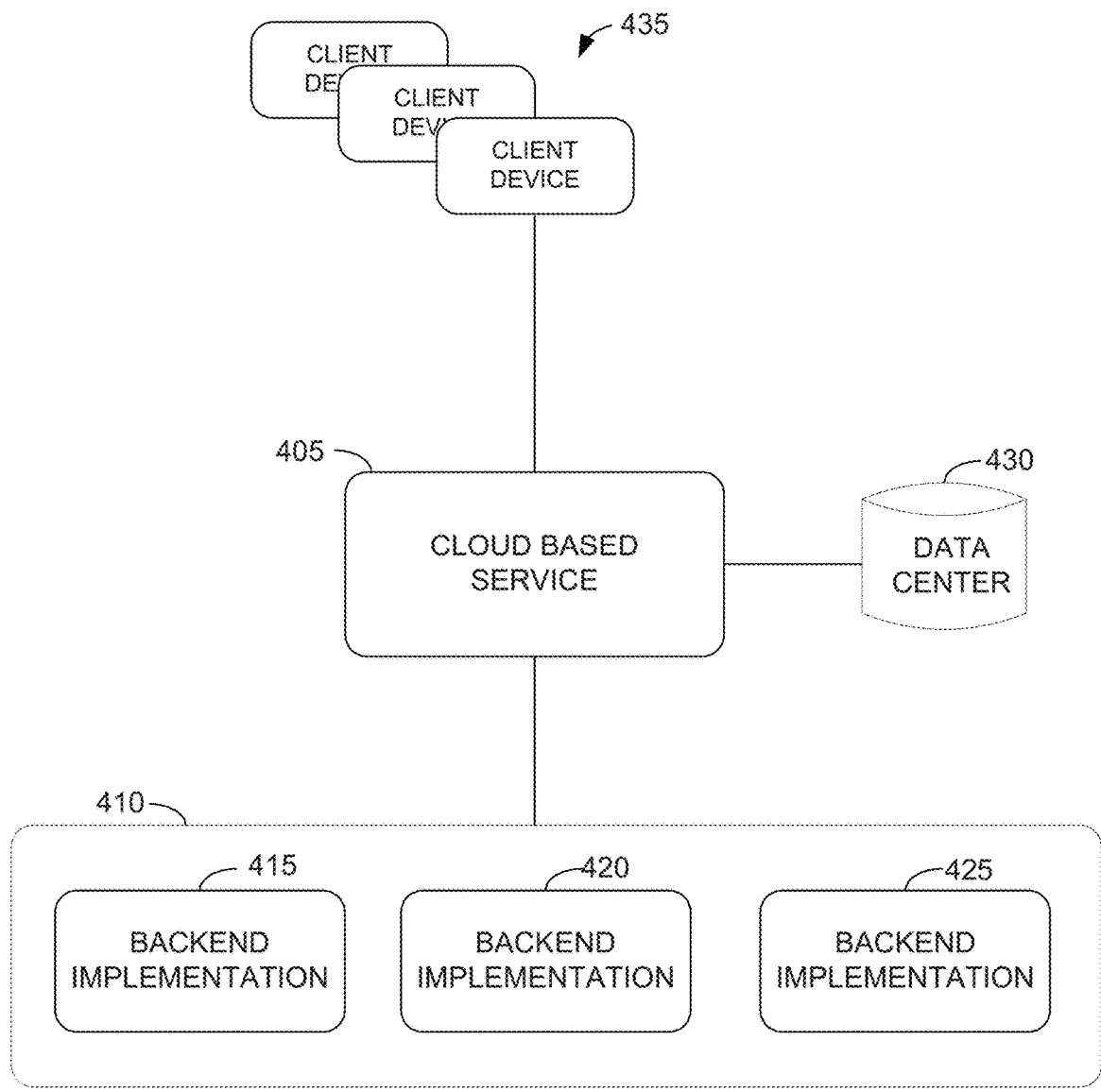
FIG. 4 is a block diagram of a data validation system or service platform, according to some embodiments.

FIG. 4 is an illustrative depiction of a logical block diagram of a computing system or platform, in accordance with some embodiments. System 400 may be, for example, associated with devices for implementing the processes disclosed herein (e.g., information flow 100 and process 300). Being a logical representation or an abstraction of a device, system, or platform, an actual implementation of system 400 is not limited to the specific configuration depicted in FIG. 4 and may include fewer, additional, alternative, and substitute components, arranged in varying configurations. For example, one or more devices and systems to facilitate communication and/or processing may be disposed between two or more components of FIG. 4, without loss of any generality within the scope herein.

System 400 includes a cloud based service 405. Cloud based service 405 may be provided by a service provider 410. Service 405 may be, without limit or loss of generality, a business service (e.g., a data evaluation and validation service, a network planning service, an airline data visualization service, etc.), a cloud-based application, and other applications and services. In some embodiments, service provider 410 may employ an instance of a database system in the implementation of backend systems 415, 420, and 425. Backend implementations 415, 420, and 425 may operate alone or in combination to deliver one or more services and applications 405 to client devices 435. The processes and concepts disclosed herein are not limited to any one system or technical implementation thereof.

In some embodiments, client devices (or simply clients) 435, service provider 410, and a data center 430 supporting the operation and availability of cloud based service 405 may be distributed throughout different locations remote from each other. For example, a client 435 located in a first city (e.g., New York) may request cloud based service 405 as provided by a service provider 410 located in a second city (e.g., Boston), where data center 430 may be embodied in a data center. In order to deliver the desired service to the client, a number of communication and data calls may typically be made to, for example, backend implementation 425 and data center 430.

In some embodiments, processes, mediums, and systems herein may operate to provide a data evaluation and validation service in a manner that enhances, for example, an accuracy of actual flight data so that corrected sets of flight data generated by the service 405 may be reliably used for a analytical, reporting, and other purposes. In some aspects, the actual flight data is analyzed based on business rules and other constraints and/or subjected to a simulation-based model of flight operations to expose and identify errors in actual flight data.

Figure 5:
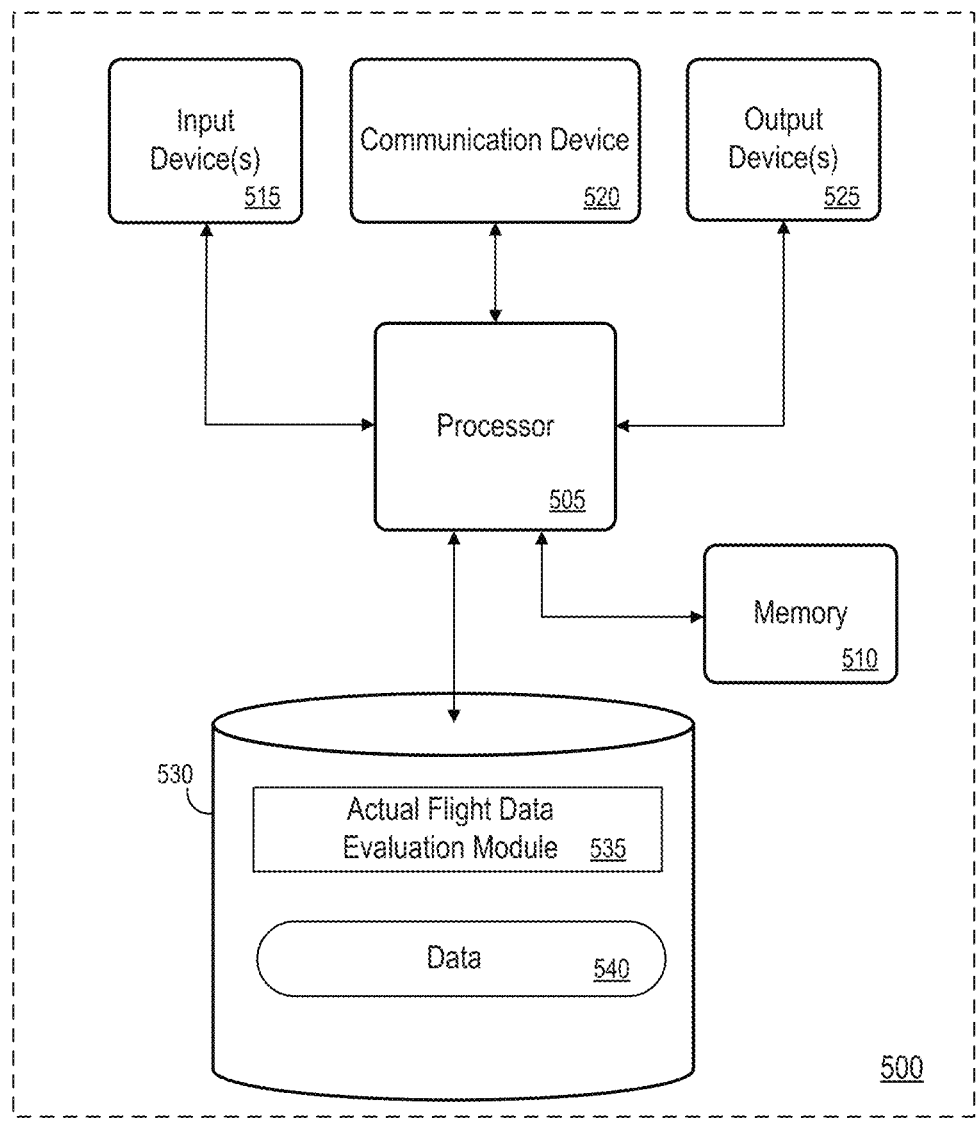
FIG. 5 is an illustrative depiction of a system, according to some embodiments.

System 500 comprises a processor 505, such as one or more commercially available Central Processing Units (CPUs) in the form of one-chip microprocessors or a multi-core processor, coupled to a communication device 520 configured to communicate via a communication network (not shown in FIG. 5) to another device or system (e.g., an administrator device or a client device, not shown). System 500 may also include a cache 510, such as RAM memory modules. The system may further include an input device 515 (e.g., a touchscreen, mouse and/or keyboard to enter content) and an output device 525 (e.g., a touchscreen, a computer monitor to display, a LCD display).

Processor 505 communicates with a storage device 530. Storage device 530 may comprise any appropriate information storage device, including combinations of magnetic storage devices (e.g., a hard disk drive), optical storage devices, solid state drives, and/or semiconductor memory devices. In some embodiments, storage device 530 may comprise a database system, including in some configurations an in-memory database.

Storage device 530 may store program code or instructions to control an operation of database engine 535 to evaluate a validity of actual flight data therein (e.g., data 540), in accordance with processes herein. Processor 505 may perform the instructions for implementing robustness evaluation module 535 to thereby operate in accordance with any of the embodiments described herein. Actual flight data module 535 may be stored in a compressed, uncompiled and/or encrypted format. Program instructions for robustness actual flight data module 535 may furthermore include other program elements, such as an operating system, a database reporting system, and/or device drivers used by the processor 505 to interface with, for example, a client, an administrator, and peripheral devices (not shown in FIG. 5). Storage device 530 may also include data 540. Data 540 may be used by system 500, in some aspects, in performing one or more of the processes herein, including individual processes, individual operations of those processes, and combinations of the individual processes and the individual process operations. For example, data 540 may comprise a persistence layer of a database system and store actual flight data and corrected flight data (i.e., test sets), etc., in accordance with some embodiments herein.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, aspects herein may be implemented by an application, device, or system to manage recovery of an entity or other application in a consistent manner across different devices, effectively across an entire domain.

As used herein, information may be "received" by or "transmitted" to, for example: (i) the platform 200 from another device; or (ii) a software application or module within the platform 200 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the figures illustrate aspects of the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). In some alternative implementations, the functions noted in a particular block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. Further, a computer program product can include a computer-readable storage medium with code adapted to be implemented to carry out one or more method steps described herein, including the provision of the system with the distinct software modules.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations. Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A system comprising:
   at least one flight generating an actual flight schedule, the actual flight schedule comprising flight data;
   a communication device operative to receive the actual flight schedule including flight details associated with each flight of the actual flight schedule;
   an actual flight data evaluation module including a simulation-based model to receive the actual flight schedule including an injection of actual, historical disturbances corresponding to a specific time frame of the flight data, and evaluate the performance thereof;
   a memory to store program instructions;
   at least one distributed database system comprising the actual flight data evaluation module and data thereof distributed among several airline relational databases; and
   at least one processor coupled to both the memory and the at least one distributed database system and in communication with the actual flight data evaluation module, the at least one processor being operative to execute program instructions to:
   receive actual flight schedule data including flight details associated with each flight of the actual flight schedule;
   determine an estimate of at least one of airline operations performance constraints and metrics based on an execution of the simulation-based model;
   correct at least one data error
   characterized as inaccuracies in the actual flight data, and with values that are outside of an acceptable range for a parameter or set of parameters, by correcting the inaccuracies based on business rules and by adjusting the parameter or set of parameters for future use,
   wherein the business rules may include rules to detect and repair temporal-spatial constraint violations in the actual flight data,
   wherein the temporal-spatial constraints address actual violations of both time and space including actual time and location conflicting data of actual flight data and/or other related resources, and
   where the at least one data error is corrected in the at least one distributed database system; and
   generate a test set of corrected actual flight data based on the estimate of at least one of airline operations performance constraints and metrics and the actual flight data after the at least one data error has been corrected.

2. The system of claim 1, wherein the at least one processor is further operative to execute program instructions to, prior to the determining of the estimate of at least one of airline operations performance constraints and metrics, collate the received actual flight schedule data,
   wherein the actual flight schedule data deviates from a planned flight schedule due to one or more airline disturbances, and
   wherein the actual flight schedule data is stored in a database management system.

3. The system of claim 2, wherein the at least one processor is further operative to execute program instructions to execute, based at least in part on the corrected actual flight data, at least one of: network planning, data visualization, and airline recovery analysis, and
   wherein the system operates to estimate network performance and metrics based on the actual flight data and at least one of business rules and a simulation-based model of flight schedule operations.

4. The system of claim 1, wherein the determining of the estimate of at least one of airline operations performance constraints and metrics based on the actual flight schedule data and at least one of business rules and an execution of a simulation-based model includes determining at least one of: temporal-spatial constraint violations, planned equipment routing constraints, root causes for propagated delays, network throughput constraints, and the correction of unrealistic data errors, and
   wherein the actual flight schedule data comprises at least one of an aircraft type, an aircraft registry, and at least one historical detail related to the flight.

5. The system of claim 1, wherein the actual flight schedule data includes at least one of public data received from a public organization, data generated internally by an airline, and data from a third-party service provider.

6. The system of claim 1, wherein the airline operations performance constraints include at least one of: planned flights, planned flight routing, transit times, turn times, equipment and personnel capacities, equipment and personnel assignments, airport capacities and constraints, and airline operations disruptions.

7. A method implemented by a computing system in response to execution of program instructions by a processor of the computing system, the method comprising:
   receiving, via a communication device, actual flight schedule data including flight details associated with each flight of the actual flight schedule comprising flight data;
   generating, via an actual flight data evaluation module, a simulation-based model to receive the actual flight schedule including injecting of actual, historical disturbances corresponding to a specific time frame of the flight data and evaluating the performance thereof;
   determining, via a processor, an estimate of at least one of airline operations performance constraints and metrics based on an execution of the simulation-based model;
   correcting at least one data error characterized as inaccuracies in the actual flight data, and with values that are outside of an acceptable range for a parameter or set of parameters by correcting the inaccuracies based on business rules and by adjusting the parameter or set of parameters for future use,
   and wherein the corrected at least one data error is corrected in at least one distributed database system including the actual flight data evaluation module and data thereof distributed among several airline relational databases; and generating a test set of corrected actual flight data based on the estimate of at least one of airline operations performance constraints and metrics and the actual flight data after the at least one data error has been corrected.

8. The method of claim 7, further comprising, prior to the determining of the estimate of at least one of airline operations performance constraints and metrics, collating the received actual flight schedule data,
  wherein the actual flight schedule data deviates from a planned flight schedule due to one or more airline disturbances, and
  wherein the actual flight schedule data is stored in a database management system.

9. The method of claim 7, further comprising:
  performing, based at least in part on the corrected actual flight data, at least one of: network planning, data visualization, and airline recovery analysis,
  wherein performing, based at least in part on the corrected actual flight data, is implemented by special purpose hardware-based systems.

10. The method of claim 7, wherein the determining of the estimate of at least one of airline operations performance constraints and metrics based on the actual flight schedule data and the business rules and an execution of the simulation-based model includes determining at least one of: temporal-spatial constraint violations, planned equipment routing constraints, root causes for propagated delays, and network throughput constraints.

11. The method of claim 7, wherein the actual flight schedule data includes at least one of public data received from a public organization, data generated internally by an airline, and data from a third-party service provider, and
  wherein the actual flight schedule data comprises at least one of an aircraft type, an aircraft registry, and at least one historical detail related to the flight.

12. The method of claim 7, wherein the airline operations performance constraints include at least one of: planned flights, planned flight routing, transit times, turn times, equipment and personnel capacities, equipment and personnel assignments, airport capacities and constraints, and airline operations disruptions.

13. A non-transitory, computer-readable medium storing instructions that, when executed by a computer processor, cause the computer processor to perform a method, the medium comprising program instructions executable by the computer processor to:
  receive, via a communication device, actual flight schedule data including flight details associated with each flight of the actual flight schedule comprising flight data;
  generating, via an actual flight data evaluation module, a simulation-based model to receive the actual flight schedule including injecting of actual, historical disturbances corresponding to a specific time frame of the flight data and evaluating the performance thereof;
  determine, via a processor, an estimate of at least one of airline operations performance constraints and metrics based on an execution of the simulation-based model;
  correcting at least one data error characterized as inaccuracies in the actual flight data, and with values that are outside of an acceptable range for a parameter or set of parameters by correcting the inaccuracies based on business rules and by adjusting the parameter or set of parameters for future use,
  wherein the corrected at least one data error is corrected in at least one distributed database system including the actual flight data evaluation module and data thereof distributed among several airline relational databases; and
  generating a test set of corrected actual flight data based on the estimate of at least one of airline operations performance constraints and metrics and the actual flight data after the at least one data error has been corrected.

14. The medium of claim 13, further comprising, prior to the determining of the estimate of at least one of airline operations performance constraints and metrics, collating the received actual flight schedule data, and
  wherein the actual flight schedule data comprises at least one of an aircraft type, an aircraft registry, and at least one historical detail related to the flight.

15. The medium of claim 13, further comprising:
  performing, based at least in part on the corrected actual flight data, at least one of: network planning, data visualization, and airline recovery analysis, and
  wherein the corrected actual flight data comprises at least one of an aircraft type and aircraft registry.

16. The medium of claim 13, wherein the determining of the estimate of at least one of airline operations performance constraints and metrics based on the actual flight schedule data and the business rules and an execution of the simulation-based model includes determining at least one of: temporal-spatial constraint violations, planned equipment routing constraints, root causes for propagated delays, network throughput constraints, and the correction of unrealistic data errors.

17. The medium of claim 13, wherein the actual flight schedule data includes at least one of public data received from a public organization, data generated internally by an airline, and data from a third-party service provider.

18. The medium of claim 13, wherein the airline operations performance constraints include at least one of: planned flights, planned flight routing, transit times, turn times, equipment and personnel capacities, equipment and personnel assignments, airport capacities and constraints, and airline operations disruptions.

19. The medium of claim 13, wherein the generated record of the estimate of at least one of airline operations performance constraints and metrics includes a set of test data to be used in an airline operation evaluation.

* * * * *